Dec. 15, 1953 O. S. FRENCH ET AL 2,662,420
ADJUSTABLE TIE ROD
Filed Nov. 22, 1949 2 Sheets-Sheet 1
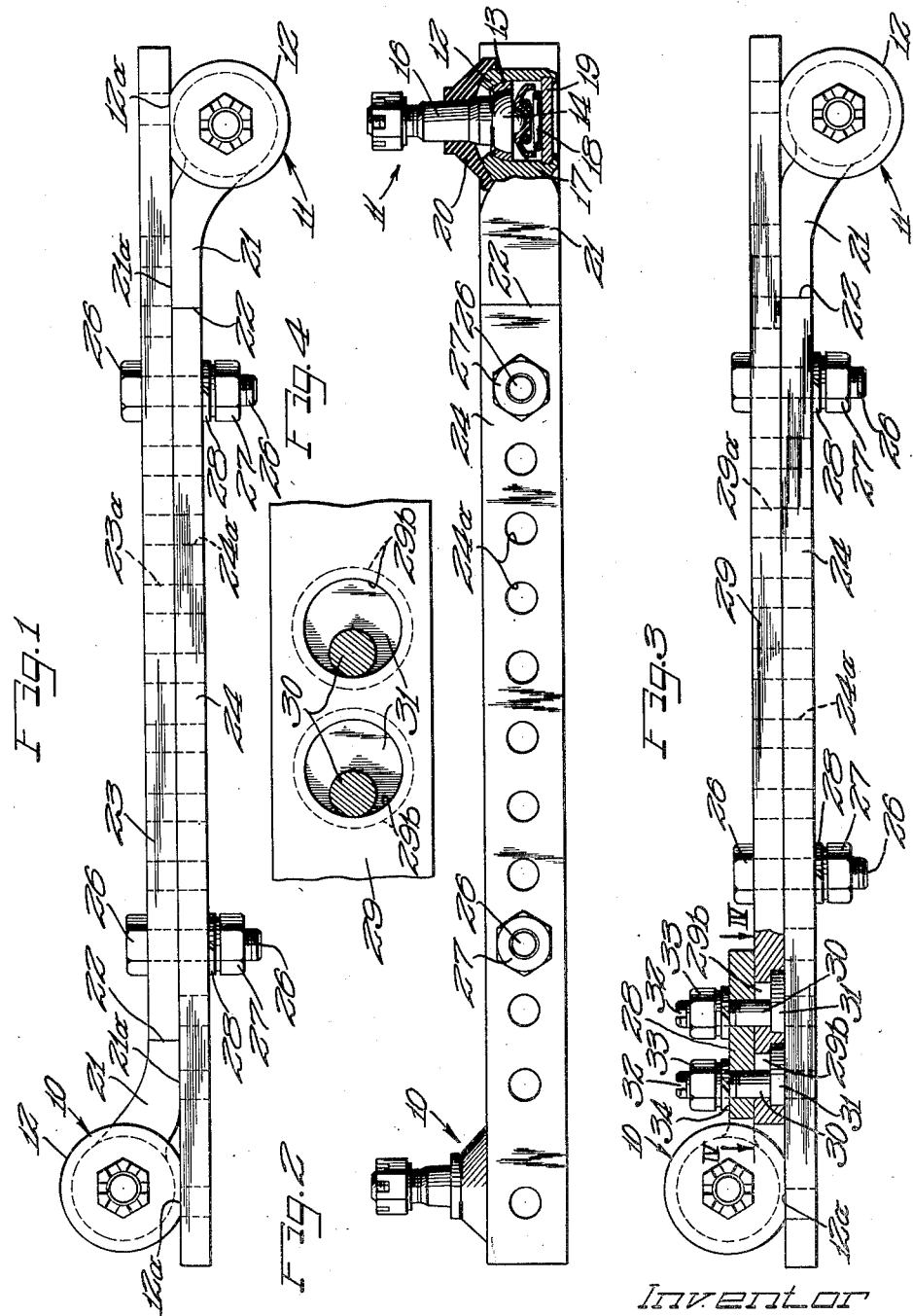
Inventor
Oliver S. French
Donald P. Marquis
Attys

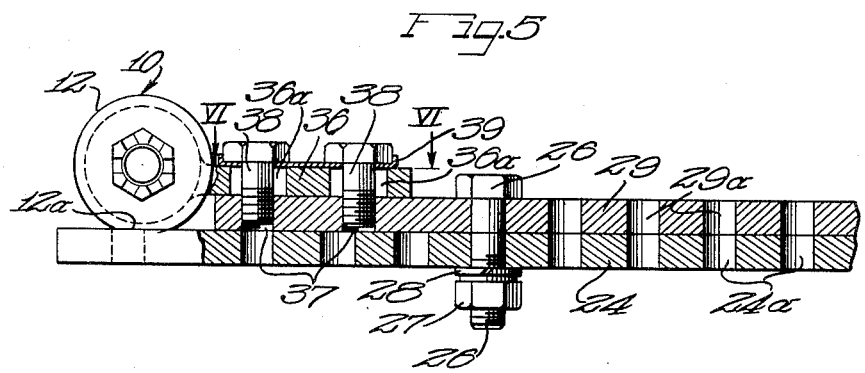
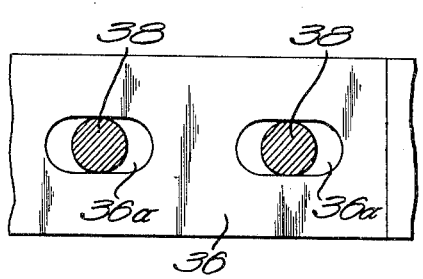
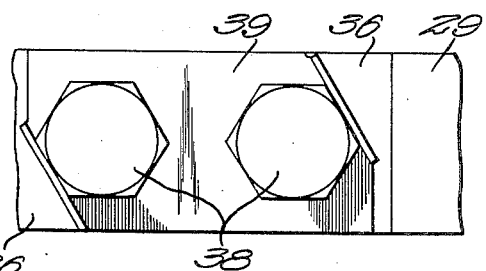
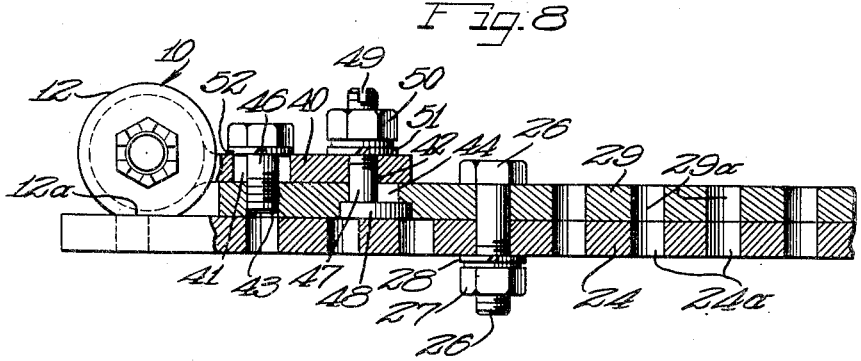

Patented Dec. 15, 1953

2,662,420

UNITED STATES PATENT OFFICE 2,662,420

ADJUSTABLE TIE ROD

Oliver S. French, Detroit, and Donald P. Marquis, Ferndale, Mich., assignors to Thompson Products, Inc., Cleveland, Ohio, a corporation of Ohio Application November 22, 1949, Serial No. 128,816

15 Claims. (Cl. 74—586)

1

This invention relates generally to an adjustable linkage adapted to selectively vary the distance between link connection points and more particularly relates to an adjustable tie rod apparatus for a vehicular steering assembly.

Although the present invention is of general utility, it finds a particularly advantageous application to the tie rod of a row crop tractor where it is useful to vary the span of the front wheels and hence necessary to vary the length of the tie rod.

Adjustable tie rods have been provided heretofore but have been seriously deficient because the range of adjustment has been invariably dependent upon the length of the shortest link. Such limitation is especially prevalent in those designs which include adjusting members consisting of a rod slidable within a tube.

According to the general features of the present invention, a pair of ball joints or sockets are provided with flattened shank portions offset from the socket axis so that an abutting mating member can extend across a side face of the socket housing. A generally rectangular rod-like stem is then butt welded or otherwise affixed to each of the flattened shanks. Adjustment of the length of the tie rod corresponding to desired changes in the axial length is made by varying the relative axial position of the stems. The stems are adapted to abut one another in back-to-back relationship and means are provided to lock the stems in adjusted position.

A further improvement of the present invention contemplates the provision of suitable adjustment means for effecting incremental adjustments in the axial length of the adjustable joint in order to secure accurate tram of the vehicle upon which the adjustable tie rod assembly is installed.

In one embodiment, an additional stem or shank is provided with an elongated aperture through which a threaded stud may extend for threaded engagement with a lengthy rod-like stem member, the ball joint or socket of this particular form being affixed to the shank and the threaded stud operative to lock the socket and the shank to the stem.

In another embodiment, one of the sockets is affixed to a third stem or shank which may be placed in assembly with a lengthy rod-like stem by means of an adjustment bolt having an eccentric head portion cooperable with a counterbored aperture formed in the rod-like stem. By rotating the head of the bolt in its counterbore, the center line of the stem of the bolt may be moved fore and aft on the tie rod, producing the small lengthwise adjustment desired to secure accurate tram of the vehicle and compensate for "toe in."

It is then an object of this invention to provide a tie rod and tie rod joint assembly having a selectively collapsible effective length not limited to the length of any of the links.

Another object of the present invention is to provide an adjustable joint adapted to vary the spacing dimension between axially separated centers having independent adjustment means for effecting incremental adjustments in the axial length of the joint.

Another object of the present invention is to provide an adjustable tie rod apparatus which is economical to manufacture and which may be fabricated from simplified elements to form a highly efficient adjustable joint.

Many additional features, advantages and further objects of the present invention will become manifest to those versed in the art upon making reference to the detailed description which follows and the annexed sheets of drawings in which:

Figure 1 is a plan view of an adjustable tie rod apparatus according to the present invention;

Figure 2 is a side elevational view, partly in section, of the adjustable tie rod apparatus shown in Figure 1;

Figure 3 is a plan view, with parts broken away and parts shown in section of an adjustable tie rod apparatus modified in accordance with one embodiment of the principles of the present invention;

Figure 4 is an enlarged fragmentary detail view taken on line IV—IV of Figure 3;

Figure 5 is a partial cross-sectional view with parts in elevation showing an alternative embodiment of an adjustable tie rod apparatus according to the present invention;

Figure 6 is an enlarged cross-sectional detail view taken on line VI—VI of Figure 5;

Figure 7 is an enlarged detail view taken substantially on a plane parallel to the plane of Figure 6 but showing additional details of construction of the adjustment means of the present invention; and Figure 8 is a partial cross-sectional view with parts in elevation of a further embodiment of the present invention in an adjustable tie rod apparatus.

As shown on the drawings:

A pair of ball joints indicated generally by the reference numerals 10 and 11 are employed to establish the axially separated connection points or centers for the assembly.

The details of construction of one of the sockets is shown on the right-hand side of Figure 2 where a housing 12 is provided in which is seated a segmented spherical bearing 13 which, in turn, seats a ball head 14 formed on the end of a ball stud 16. The ball head 14 is urged upwardly by a retainer 17 which is spring urged by a spring 18 shouldered against a closure plate 19. After the elements of the socket are assembled, the edges of the housing 12 may be peened over to lock the closure plate 19 in place. A dust cover 20 may also be provided for the socket.

According to the present invention and as shown in Figures 1 and 2, a shank 21 on each of the socket housings 12 is preferably flattened and offset. Each shank portion 21 is shaped to approximately rectangular configuration and is offset from the axis of the housing 12 so that the outer face thereof 21a will project beyond or be flush with the adjacent side face 12a of the socket housing.

A generally rectangular rod-like stem is butt welded as at 22 or otherwise affixed to the end face of each of the flattened shank portions 21. The stems are indicated by the reference numerals 23 and 24 respectively.

The stems 23 and 24 are preferably of the greatest possible thickness through which an adequate bolt hole may be formed by a punching operation. Each of the stems 23 and 24 is provided with a plurality of spaced apertures 23a and 24a. In this manner, the stems are adapted to be placed in selected axial positions in back-to-back relationship with the apertures 23a and 24a in register with one another.

Locking means are insertable through one or more of the registering apertures to maintain the stems in locked together adjustment. The locking means may conveniently comprise a bolt 26 with a nut 27 threadable thereon for seating against a lock washer 28. A pair of bolts is preferably used as shown.

It will be apparent that the adjustable joint described permits very short adjusted lengths to be attained since it is possible to have the stems 23 and 24 protrude beyond the sockets 10 and 11. The projecting stem ends preferably abut flat faces 12a on the housing 12 to further stiffen the linkage. Moreover, the adjustable joint can be produced with great economy since the adjustment holes require only a simple punching operation and the elements of the joint may be fabricated from readily available metal forms.

Referring now to Figures 3 and 4, an alternative embodiment of the present invention is shown. In this form one of the socket housings such as the socket housing 12 is provided with a flattened and offset shank portion 21 suitably affixed as at 22 to a stem 24 provided with a plurality of spaced apertures 24a. The other socket housing, such as the housing 12 for the socket 10, is provided with a stem in the form of a flattened shank 28. The shank 28, instead of being welded to an elongated bar, as in Figures 1 and 2, overlies a separate bar 29 having apertures 29a along its length. One or more of the apertures near one end of the bar are counterbored apertures 29b. The counterbored portion of the apertures 29b are machined eccentrically with respect to the through hole portion of the apertures 29b in the bar 29.

A pair of adjustment bolts 30 having head portions eccentrically disposed relative to the center line of the bolt stem extend through the bolt hole apertures of the shank 28 and the heads 31 fit into each respective counterbore of the counterbored apertures 29b. The ends of the bolts 30 may be slotted as at 32 for cooperation with an adjusting tool such as a screw driver, or the like, and may also be threaded to receive a nut 33 which may be drawn on the bolt 30 against the bias of a lock washer 34.

By rotating the heads 31 of the bolts 30 in the counterbored portion of the apertures 29b, the center lines of the stems of the bolts may be moved fore and aft, thereby producing incremental lengthwise adjustments.

Large adjustments of the spacing dimension between socket centers will be effected as before by relocating or relatively re-positioning the stem 24 and the bar 29. It will be apparent that the bar 29, being affixed in locked relationship to the socket 10, actually comprises a stem therefor. Thus, relocation of the stems in selected axial positions may be effected to vary the length of the adjustable joint.

The embodiment of Figures 5, 6 and 7 is identical to the structure of Figures 3 and 4 with the exception of the incremental adjustment means. In this form, the socket 10 is provided with a shank 36 defining one or more slotted apertures 36a. The bar 29 is provided with one or more threaded apertures 37 to receive cap screws 38 therein. Thus, the socket 10 and the shank 36 are held in assembly with the bar 29 by the cap screws 38 which extend through the elongated apertures 36a into the threaded apertures 37.

As will be noted particularly upon Figure 6, the cap screws 38 fit loosely in the elongated apertures 36a. Thus, small lengthwise adjustment required for accurate tramming of the vehicle may be attained by moving the socket 10 and the shank 36 to various adjusted positions with respect to the cap screws 38 prior to tightening of the cap screws.

A tab washer 39 or other suitable lock washer means may be provided between the cap screws 38 and the shank 36 so as to retain the cap screws in their locked adjusted position. Tabs 39a are turned up on the washer plate against a flat side of the adjacent screw head to lock the screws in position.

The embodiment of Figure 8 shows a possible variation of the embodiments previously described. In this form, the socket 10 is provided with a shank 40 having one elongated aperture 41 and one bolt hole aperture 42. The bar 29 is likewise provided with one threaded aperture 43 and a counterbored aperture 44. A cap screw 46 extends through the elongated aperture 41 and into the threaded aperture 43, and an adjustment bolt 47 having an eccentric head portion 48 passes through the bolt hole aperture 42 for cooperation with the counterbored aperture 44.

The adjustment bolt 47 may be slotted as at 49 for cooperation with an adjustment tool such as a screw driver or the like and may be threaded to receive a nut 50 to be drawn up on the bolt 47 against a lock washer 51. A lock washer 52 may also be provided for the cap screw 46.

In operation, this form effects incremental adjustment of the joint length for accurate "toe in" adjustment or tramming by rotational adjustment of the bolt 47 within the counterbored aperture 44. Once a setting is obtained, the cap screw 46 and the nut 50 may be drawn up tightly to lock the socket 10 and the shank 40 securely with the bar or stem 29.

It will be apparent that we have not only described an adjustable joint which permits a very great range of adjustment to be attained completely independent of the length of the adjusting element but which, in addition, includes a fine adjustment feature which permits the accurate adjustment of axial length to compensate for minor manufacturing tolerances in the manufacture of axles and steering arms as well as for fine adjustment in regulating toe-in and tramming.

Although it is possible that a person skilled in the art might suggest various minor modifications to the preferred embodiments herein described by way of illustrative example only, it should be understood that we do not propose to be limited to the precise details defined only for the sake of clarity but wish to embrace within the scope of this patent all such modifications as reasonably and properly come within the scope of our contribution to the art.

We claim as our invention:

1. An adjustable tie rod apparatus for a vehicular steering assembly comprising a pair of socket members, shank means formed on the socket members, the shank means being substantially offset beyond an end of a diameter of the socket members, a bar-like stem attached to one of the shank means, the other of the shank means defining a bolt hole aperture, a second bar-like stem, both of said stems defining a plurality of equally spaced apertures, said stems abutting one another in back-to-back relationship with the spaced apertures in register with one another, locking means inserted through one or more of the registering apertures to lock the stems in selected adjusted positions to effect variations in the spacing between socket member centers, a counterbored aperture defined near the end of the second bar-like stem, the counterbored portion of the aperture being eccentrically offset with respect to the through hole portion of the aperture, and an adjustment bolt located in the bolt hole aperture in the shank and in the counterbored aperture, the adjustment bolt having an eccentric head portion cooperable with the counterbored aperture in the bar-like stem whereupon rotational adjustment of the adjustment bolt will effect incremental changes in the axial length of the tie rod apparatus.

2. An adjustable joint adapted to vary the spacing dimensions between axially separated centers comprising, a first elongated stem, a second elongated stem, both of said stems defining a plurality of spaced apertures, said stems being placed in selected axial positions in back-to-back relationship with the apertures in register with one another, locking means inserted through one or more of the registering apertures to maintain the stems in locked-together adjustment, a third stem, said third stem defining an aperture, one of said other stems defining a counterbored aperture and a bolt having an eccentric head portion in the counterbored aperture to lock the third stem to the other of said stems, whereby incremental adjustments in the axial length of the joint may be effected by rotatable adjustment of the bolt.

3. An adjustable joint adapted to vary the spacing dimensions between axially separated centers comprising, a first elongated stem, a second elongated stem, both of said stems defining a plurality of spaced apertures, said stems being placed in selected axial positions in back-to-back relationship with the apertures in register with one another, locking means inserted through one or more of the registering apertures to maintain the stems in locked-together adjustment, a third stem, said third stem defining an aperture, one of said other stems defining a counterbored aperture and a bolt having an eccentric head portion in the counterbored aperture to lock the third stem to the other of said stems, whereby incremental adjustments in the axial length of the joint may be effected by rotatable adjustment of the bolt, and locking means to lock the bolt in adjusted position.

4. An adjustable joint adapted to vary the spacing dimension between axially separated centers, comprising a first elongated stem, a second elongated stem, both of said stems being placed in selected axial positions in back-to-back relationship, said stems defining a plurality of spaced apertures to register with one another, locking means inserted through one or more of the registering apertures to maintain the stems in locked-together adjustment, a third stem, said third stem defining a pair of spaced apertures, one of said other stems defining a pair of counterbored apertures, the counterbored portions of said counterbored apertures being eccentrically disposed relative to the through hole portions of the apertures and a pair of bolts each having eccentrically disposed head portions in a corresponding one of the counterbored apertures to lock the third stem to the other of said stems, whereby incremental adjustments in the axial length of the joint may be effected by rotatable adjustment of the bolts to turn the head portions within the counterbored portions of the apertures.

5. An adjustable joint adapted to vary the spacing dimension between axially separated centers comprising, a first elongated stem, a second elongated stem, both of said stems defining a plurality of spaced apertures, said stems being placed in selected axial positions in back-to-back relationship with the apertures in register with one another, locking means inserted through one or more of the registering apertures to maintain the stems in locked-together adjustment, a third stem, said third stem defining an elongated aperture, one of said other stems defining a threaded aperture and a cap screw inserted through the elongated aperture and threaded into the threaded aperture to lock the third stem to the other of said stems, whereby incremental adjustments in the axial length of the joint may be effected by relocating the third stem relative to the cap screw.

6. An adjustable joint adapted to vary the spacing dimension between axially separated centers comprising, a first elongated stem, a second elongated stem, both of said stems defining a plurality of spaced apertures, said stems being placed in selected axial positions in back-to-back relationship with the apertures in registry with one another, locking means inserted through one or more of the registering apertures to maintain the stems in locked-together adjustment, a third stem, said third stem defining an elongated aperture, one of said other stems defining a threaded aperture and a cap screw inserted through the elongated aperture and threaded into the threaded aperture to lock the third stem to the other of said stems, whereby incremental adjustments in the axial length of the joint may be effected by relocating the third stem relative to the cap screw, and locking means cooperable with the cap screw to maintain the cap screw in locked adjusted position.

7. An adjustable joint adapted to vary the spacing dimension between axially separated centers comprising, a first elongated stem, a second elongated stem, both of said stems defining a plurality of spaced apertures, said stems being placed in selected axial positions in back-to-back relationship with the apertures in register with one another, means to maintain the stems in locked-together adjustment, a third stem, said third stem defining an elongated aperture and a bolt hole aperture, one of said other stems defining a threaded aperture and a counterbored aperture, a cap screw inserted through the elongated aperture and into the threaded aperture and an adjustment bolt through the bolt hole aperture and having an eccentric head portion in the counterbored aperture, said cap screw and said bolt serving to lock the third stem to the other stem, said third stem being movable to effect incremental adjustments in the axial length of the joint upon making rotational adjustment of the adjustment bolt.

8. An adjustable joint adapted to vary the spacing dimensions between axially separated centers comprising, a first elongated stem, a second elongated stem, both of said stems defining a plurality of spaced apertures, said stems being placed in selected axial positions in back-to-back relationship with the apertures in register with one another, means to maintain the stems in locked-together adjustment, a third stem, said third stem defining an elongated aperture and a bolt hole aperture, one of said other stems defining a threaded aperture and a counterbored aperture, a cap screw inserted through the elongated aperture and into the threaded aperture and an adjustment bolt through the bolt hole aperture and having an eccentric head portion in the counterbored aperture, said cap screw and said bolt serving to lock the third stem to the other stem, said third stem being movable to effect incremental adjustments in the axial length of the joint upon making rotational adjustment of the adjustment bolt, and means to lock the cap screw and the adjustment bolt in adjusted position.

9. An adjustable joint adapted to vary the spacing dimensions between axially separated centers comprising, a first elongated stem, a second elongated stem, both of said stems defining a plurality of spaced apertures, said stems being placed in selected axial positions in back-to-back relationship with the apertures in register with one another, means to maintain the stems in locked-together adjustment, a third stem, said third stem defining an elongated aperture and a bolt hole aperture, one of said other stems defining a threaded aperture and a counterbored aperture, a cap screw inserted through the elongated aperture and into the threaded aperture and an adjustment bolt through the bolt hole aperture and having an eccentric head portion in the counterbored aperture, said cap screw and said bolt serving to lock the third stem to the other stem, said third stem being movable to effect incremental adjustments in the axial length of the joint upon making rotational adjustment of the adjustment bolt, and means to lock the cap screw and the adjustment bolt in adjusted position, said means including a nut threaded on a threaded portion of the adjustment bolt and adapted to clamp the third stem when tightened, and lock washer means insertable between the nut and the stem and the cap screw and the stem, said lock washer means being cooperable with the cap screw and the nut to retain the cap screw and the nut against rotational displacement.

10. An adjustable tie rod comprising a first socket member, a second socket member, means providing elongated stems and being attached to each of said first and second socket members, each of said stems defining a plurality of spaced apertures adapted to lie in registry with one another when the stems abut one another in back-to-back relationship, means to lock the stems in selected adjusted axial positions, and an adjustable connection between one of the socket members and one of the stems to effect incremental changes in axial length of the tie-rod, said socket members and said stems being relatively laterally spaced for axially positioning said socket members closer than the lengths of said stems.

11. An adjustable tie rod apparatus for a vehicular steering assembly comprising a first socket member, an elongated stem attached thereto, a second elongated stem, each of said stems defining a plurality of spaced apertures adapted to lie in register with one another when the stems abut one another in back-to-back relationship, a second socket member having a flattened shank portion and adjustment connection means for connecting the second socket member to the second stem, said adjustment connection means including a bolt having an eccentric head portion and a cooperating counterbore portion in the second stem receiving said eccentric head portion whereby incremental changes in axial length of the spacing dimensions between socket member centers may be effected by turning said bolt and large variations in the spacing dimensions between socket member centers may be effected by relocating the stems, and locking means for locking the stems in selected adjusted axial positions.

12. In an adjustable joint having axially separated centers, a pair of stems relatively adjustable to vary the spacing dimensions between the axially separated centers, means to lock the stems in adjusted position, and a third stem having an adjustable connection with one of the other stems to effect incremental changes in the axial spacing dimension between the centers.

13. In an adjustable joint having axially separated centers, a pair of stems relatively adjustable to vary the spacing dimensions between the axially separated centers, means to lock the stems in adjusted position, and a third stem having an adjustable connection with one of the other stems to effect incremental changes in the axial spacing dimension between the centers, said adjustable connection including a rotatable bolt having an eccentric head portion and a counterbored aperture defined in one of the stems, the counterbored portion of the aperture being eccentrically offset and adapted to cooperatively receive the eccentric head portion of the bolt, whereby small incremental adjustments in the axial spacing dimension between the centers may be effected by rotational adjustment of the bolt.

14. In an adjustable joint having axially separated centers, a pair of stems relatively adjustable to vary the spacing dimension between the axially separated centers, means to lock the stems in adjusted position, a third stem having an adjustable connection with one of the other stems to effect incremental changes in the axial spacing dimension between the centers, said adjustable connection including a rotatable bolt having an eccentric head portion and a counterbored aperture defined in one of the stems, the counterbored portion of the aperture being eccentrically offset and adapted to cooperatively receive the eccentric head portion of the bolt, whereby small incremental adjustments in the axial spacing dimension between the centers may be effected by rotational adjustment of the bolt, and means to lock the rotatable bolt in adjusted position.

15. An adjustable joint assembly comprising a pair of joint members each having a housing with a stem means projecting therefrom, a joint stud having a head tiltably and rotatably mounted in said housing, and a shank projecting freely through an end face of the housing, said stem means having mating faces along their lengths and being offset relative to the corresponding housing so a free end portion of a stem means overlaps a side face of the housing carrying the other stem means when the stem means are in mated face-to-face engagement, and means locking said stem means together in mated face-to-face engagement at selected positions.

OLIVER S. FRENCH.
DONALD P. MARQUIS.

References Cited in the file of this patent

UNITED STATES PATENTS

| Number | Name | Date |
|---|---|---|
| 136,690 | Aufdembrinke | Mar. 11, 1873 |
| 535,314 | Bartlett et al. | Mar. 5, 1895 |
| 864,329 | North | Aug. 27, 1907 |
| 935,176 | Thompson | Sept. 28, 1909 |
| 1,097,185 | Oehrle | May 19, 1914 |
| 1,301,971 | Reed | Apr. 29, 1919 |
| 1,318,611 | Shaffer | Oct. 14, 1919 |
| 1,347,841 | De Voe | July 27, 1920 |
| 1,652,677 | McCoy et al. | Dec. 13, 1927 |
| 2,049,502 | Hufferd et al. | Aug. 4, 1936 |
| 2,077,620 | Dicke | Apr. 20, 1937 |

FOREIGN PATENTS

| Number | Country | Date |
|---|---|---|
| 15,281 of 1902 | Great Britain | May 21, 1903 |